US008676519B2

(12) United States Patent
Liberge et al.

(10) Patent No.: US 8,676,519 B2
(45) Date of Patent: Mar. 18, 2014

(54) DEVICE AND METHOD FOR ASSISTING INFLATION

(75) Inventors: Franck Liberge, Durtol (FR); Philippe Corniot, Enval (FR)

(73) Assignees: Compagnie Generale des Etablissements Michelin, Clermont-Ferrand (FR); Michelin Recherche et Technique S.A., Granges-Paccot (CH); TRW Automotive U.S. LLC, Livonia, MI (US)

( * ) Notice: Subject to any disclaimer, the term of this patent is extended or adjusted under 35 U.S.C. 154(b) by 262 days.

(21) Appl. No.: 13/001,651

(22) PCT Filed: Jun. 30, 2009

(86) PCT No.: PCT/EP2009/058170
§ 371 (c)(1),
(2), (4) Date: Mar. 8, 2011

(87) PCT Pub. No.: WO2010/000731
PCT Pub. Date: Jan. 7, 2010

(65) Prior Publication Data
US 2011/0184669 A1  Jul. 28, 2011

(30) Foreign Application Priority Data

Jun. 30, 2008  (FR) ...................... 08 54384

(51) Int. Cl.
*G06F 19/00* (2011.01)
(52) U.S. Cl.
USPC ................. 702/50; 702/98; 702/99; 702/104; 702/138; 702/140

(58) Field of Classification Search
USPC ............... 702/138, 104, 98, 50, 99, 130, 136, 702/140; 340/442, 449; 73/708, 146; 524/492, 495
See application file for complete search history.

(56) References Cited

U.S. PATENT DOCUMENTS

| | | | |
|---|---|---|---|
| 5,035,274 A | 7/1991 | Kinnick et al. | 157/1.1 |
| 5,140,851 A | 8/1992 | Hettich et al. | 73/146.5 |
| 5,780,733 A * | 7/1998 | Meunier | 73/146.2 |
| 5,886,624 A * | 3/1999 | Hebert | 340/442 |

(Continued)

FOREIGN PATENT DOCUMENTS

| | | | |
|---|---|---|---|
| FR | 2 667 270 A1 | 4/1992 | |
| FR | 2 829 422 A1 | 3/2003 | |

(Continued)

*Primary Examiner* — Marc Armand
*Assistant Examiner* — Ivan Rabovianski
(74) *Attorney, Agent, or Firm* — Fitzpatrick, Cella, Harper & Scinto

(57) ABSTRACT

A device and a method for aiding inflation for a vehicle involves obtaining access to vehicle tire pressure and temperature data, and utilizing an under-inflation detection module and an inflation condition testing module, thus making it possible to carry out a test for detecting a possible optimal inflation condition if the following criteria are met:—there is a non-critical under-inflation state for at least one of the vehicle tires;—the tires are not in an overheated state;—and the tire state is unchanged by sunlight. When the test module determines the optimal inflation condition, a signal is outputted. Such a method causes tire inflation to be carried out under favorable conditions actually corresponding to the reference value provided by the manufacturers.

18 Claims, 2 Drawing Sheets

(56) References Cited

U.S. PATENT DOCUMENTS

| | | | |
|---|---|---|---|
| 6,711,955 B1 * | 3/2004 | Wilkerson, Jr. | 73/708 |
| 7,197,922 B2 * | 4/2007 | Rimkus et al. | 73/146 |
| 7,648,062 B2 | 1/2010 | Corniot | 235/375 |
| 2003/0070477 A1 * | 4/2003 | Fischer et al. | 73/146 |
| 2003/0074961 A1 | 4/2003 | Fischer et al. | 73/146 |
| 2003/0164759 A1 | 9/2003 | Nantz et al. | 340/442 |
| 2005/0162263 A1 | 7/2005 | Fennel et al. | 340/442 |
| 2005/0200464 A1 * | 9/2005 | Bennie et al. | 340/442 |
| 2006/0276990 A1 | 12/2006 | Abramovitch | 702/138 |
| 2007/0191996 A1 * | 8/2007 | Bondu | 701/1 |
| 2009/0091437 A1 | 4/2009 | Corniot | 340/442 |
| 2010/0288039 A1 | 11/2010 | Liberge et al. | 73/146.5 |

FOREIGN PATENT DOCUMENTS

| | | |
|---|---|---|
| FR | 2 829 423 A1 | 3/2003 |
| FR | 2 885 321 A1 | 11/2006 |
| GB | 2 388 197 A | 11/2003 |

\* cited by examiner

DEVICE AND METHOD FOR ASSISTING INFLATION

FIELD OF THE INVENTION

The present invention relates to a device and a method for inflation assistance for a vehicle making it possible to inform the driver that at least one of the tires of the vehicle must be reinflated, and to encourage him to carry out this reinflation at times when the optimal conditions are present.

BACKGROUND

Many technologies have been designed to allow motorists to carry out the inflation of the tires after running, with no distance constraint.

Since the tires are then at a temperature higher than the standard inflation temperature, if the standard pressure value is used directly, under-inflation is then obtained, the magnitude of which depends on the difference between the real inflation temperature and recommended standard temperature.

For example, if the tires of a vehicle are reinflated in a heated state, after running, on an indicated pressure base of 2.0 bar, when the tires have cooled down, it is probable that the user will obtain a significant pressure difference of the order of 130 to 180 mbar between the front tires and the rear tires. Specifically, on most current motor vehicles, the temperature of the front tires rises more than that of the rear tires. Typically, for a difference of approximately 15° C., the pressure difference is approximately 150 mbar. If inflation is carried out when hot with tires having excess pressure due to the heat, and without taking account of this excess pressure, the result will be under-inflation. Specifically, when the tires cool, the excess pressure disappears. The tires are then under-inflated by a value depending on the magnitude of the excess pressure induced by the heating and present at the time of inflation.

Such a real pressure difference may have an impact on the driving of the vehicle, its road behaviour, its road holding, etc.

According to another typically-known case, the temperature difference between a tires situated in the shade and a tires situated in the sun may reach 15° C. to 20° C. and even more. This causes an induced pressure difference that may reach or even exceed 200 mbar, for example between the tires on the driver's side, sheltered from the sun, and the tires on the passenger side, exposed to the sun. If reinflation takes place in such a context, the real pressure of the tires when the temperatures have returned to a balanced state could be 200 mbar less than the value indicated during inflation when hot and therefore not only would the tires be under-inflated relative to the recommended pressure but also out of balance relative to the opposite side.

Here again, such a real pressure difference may have an impact on the driving of the vehicle, its road behaviour, its road holding, etc.

Therefore, to alleviate this situation, various means and methods are used to compensate for the inflation pressure value.

Document FR2885321 describes a solution consisting in providing means for analysing the pressure and temperature comparing the measured value of the tire's inflation pressure with a recommended pressure. The real inflation pressure is corrected according to the tire temperature indicated by a device for detecting tire temperature. The reference temperature value used is established according to the temperatures measured during the latest start-ups of the said vehicle.

Document FR2667270 deals with the context specific to the inflation of the tires at the factory, in order to compensate for the temperature variations during the inflation process. This objective is achieved by incorporating a means for automatically detecting the temperature of the compressed air used in the inflation of the tires and the ambient temperature of the factory, and in adjusting the predetermined inflation pressure in order to take account of these variables. In addition, the inflation device presented incorporates a means for detecting the real inflation pressure of the wheel/tire assembly during the inflation process in order to have the assurance that the temperature-compensated inflation pressure is really obtained. This device, involving the use of two means for measuring the temperature (one for the ambient temperature and the other for the temperature of the inflation air), is technically difficult to apply on inflation sites intended for the consumer, because such sites have to be low-cost in order to be able to be present in large numbers over the whole road network.

Document GB2388197 describes a device in which the vehicle is fitted on the one hand with temperature sensors making it possible to determine the tire temperature and on the other hand with pressure sensors. Therefore, the inflation may be carried out taking account of the real temperature of the tires.

Document U.S. Pat. No. 5,140,851 describes a device making it possible to compensate for errors in measuring the temperature when the tire air temperature and volume are determined. A correction means based on correction parameters makes it possible to obtain corrected values. Furthermore, the device makes it possible to reveal a possible reduction in the tire air volume.

Document U.S. Pat. No. 6,711,955 describes a device making it possible to inflate the tires in the hot state, in order to prevent having to wait for the latter to cool down before carrying out the inflation. This device involves two temperature sensors in order to detect the temperature of the tire and of the ambient air. A processor makes it possible to compare the temperature and pressure values with a recommended value. This device is particularly suitable for the inflation of aircraft tires.

Document US2005162263 describes a method making it possible to inflate tires while taking account of two distinct temperature values in order to compensate for the effect of this temperature on the pressure. The temperature measurements are taken at the rim and at the brakes of the vehicle.

Document US 2006276990 describes an inflation device provided with a controller storing a target pressure value to which the tire should be inflated when it is at a standard temperature. Data relating to the real pressure and temperature are obtained and are used to determine a refill pressure compensated for according to the temperature.

The document FR 2.829.423 described a system for the detection of a pressure decrease in a tire which contains a probe of pressure of air, a temperature sensor of the tire and a unit of evaluation. The unit of evaluation converts the values of pressure of air and the values of temperature measured in values of pressure of air compensated in temperature, determines the modification in the time of the values of pressure of air compensated and generates a signal of warning if the modification in time exceeds a threshold value. The unit of evaluation decreases the threshold value of modification of pressure of air when the difference between the value of pressure of air measured and compensated in temperature compared to a value of reference of pressure of air predetermined and compensated in temperature increases.

In all these documents, it is accepted that the inflation of the tires in the hot state has serious disadvantages that it is preferable to avoid. All these devices and methods make reference to means making it possible to carry out an inflation at ambient temperature while making a compensation based on the one hand on pressure and temperature measurements and on the other hand on compensation computations. Many sources of errors and/or inaccuracies are present both in the measurements taken and in the computations made for the compensation.

Moreover all these documents propose systems which inform the driver of the vehicle when a problem of inflation exists in an unquestionable way to limit the number of transmitted alarms. In spite of that the messages transmitted to the driver are often not understood and call even into question the confidence of these drivers towards these systems.

BRIEF DESCRIPTION OF THE INVENTION

There is thus a real need for a process for monitoring for the tires which transmits to the driver simple messages, comprehensible and likely to reinforce the confidence of the drivers for the utility of these systems by also facilitating the management of the inflation of the tires.

Thus, to mitigate these many disadvantages, the invention envisages a method of assistance to the inflation of tires for vehicles equipped with a set of tire pressure sensors, a set of tire temperature sensors, and computing means, wherein:

the computing means are supplied with the data relating to the pressure of the vehicle's tires;
the computing means are supplied with the data relating to the temperature of the said tires;
depending on the pressure and temperature data obtained, the user verifies, with the aid of the computing means, a possible under-inflation condition present on one or more tires; and
if an under-inflation condition is detected, the user, with the aid of the computing means, carries out a test in order to reveal a possible optimal condition for inflation, if all the following criteria are simultaneously satisfied:
  a non-critical under-inflation condition has been detected for at least one of the tires of the vehicle;
  the tires are not in a heated state; and
  the state of the tires is not changed by exposure to the sun;
when an optimal condition for inflation is revealed, a corresponding signal is sent.

Such a method of assistance to the inflation of tires has the advantage to indicate to the driver when he can carry out the process of inflating the tires in favourable conditions, namely conditions really corresponding to the reference value supplied by the manufacturers, without having to compensate according to a higher inflation temperature. Therefore, it is possible to reduce the frequency of inflation. An inflation carried out in good conditions also makes it possible to optimize the performance of the tires and of the vehicles, whether it be in terms of comfort, road holding or fuel consumption.

When the above three conditions are met: non-optimal inflation state of the tires, absence of heating due to running and absence of disruption due to exposure to the sun, the optimum conditions for inflation are achieved. Each of these conditions is necessary and it is the fact of verifying these three conditions simultaneously which guarantees the optimum conditions for an effective and durable inflation.

When the above three conditions are satisfied, the state of inflation of the vehicle's tires is not critical, that is to say does not require the transmission to the driver of an imperative alert. The signal to be transmitted by the device described may therefore be an indicative signal informing the driver that the optimum inflation conditions are satisfied, for example a "green light". This signal must furthermore be switched off as soon as any one of these three conditions is no longer satisfied.

The device has the advantage of converting a usually "non-critical alarm" message into a service designed to help the driver to inflate his tires at the most appropriate times.

The signal may make it possible to generate a motivational message (audible or visual) intended for the driver in order to warn him that the tires are slightly under-inflated and that the conditions are optimum for inflation to the recommended pressure. Usually, this condition is observed for a relatively short, but variable, period, once the vehicle is moving. It is therefore useful for the driver to be able to identify this condition in a precise and sure way. This message or signal may reappear every time the conditions are again satisfied.

Preferably, a non-critical under-inflation condition corresponds to a measured inflation pressure that is less by substantially 200 to 400 mbar than the nominal pressure recommended when cold. When the measured pressure becomes less by 400 mbar and more, it is no longer possible to speak of a non-critical condition and an alarm message to the driver becomes imperative.

It should be noted that these values are given to illustrate the device for passenger vehicles. These values can very easily be adapted by a skilled man for any other type of vehicles.

It is also possible to consider a "non-critical under-inflation condition" to be the state of a vehicle's tires in which one of the tires is markedly less (or more) inflated than the average of the other three, while not having a measured inflation pressure that is less than the recommended inflation pressure.

According to an advantageous embodiment, the parameters of the test are defined so that the tires are not considered in a heated state if the difference between the ambient temperature and the value of the temperature of each of the tires of the vehicle does not exceed 5° C.

According to another embodiment, the parameters of the test are defined so that the tires are not considered in a heated state if there is less than 5° C. of difference between the average of the temperatures at the front and the average of the temperatures at the rear of the vehicle.

According to a further embodiment, the parameters of the test are defined so that the tires are not considered in a heated state if the difference between the tire temperature value of the spare wheel tire and the average of the temperatures values of the tires of the vehicle does not exceed 5° C.

Advantageously, the parameters of the test are defined so that the state of the tires is not considered changed by exposure to the sun when the maximum temperature difference between the hottest tire and the coldest tire does not exceed 5° C. and preferably 3° C.

These tests may be cumulative.

Advantageously, in order to reveal a possible optimal condition for inflation, the user verifies that the following criterion is also satisfied: the tires are at a temperature substantially close to that measured at the moment of detection of under-inflation. As an example, a difference of 0 to 5° C. will be considered negligible and both temperatures are then considered close.

Preferably, the inflation assistance method stops transmitting a signal encouraging inflation as soon as any one of the three conditions for an optimum inflation condition is no longer satisfied.

The invention also provides for an inflation assistance device for a vehicle comprising:
- an access to a vehicle's tire pressure data;
- an access to the temperature data of the said tires;
- an under-inflation detection module making it possible, according to the pressure and temperature data obtained, to reveal a possible under-inflation condition present on one or more tires;
- a module for testing the inflation condition, making it possible to carry out, with the aid of computation means, a test in order to reveal a possible optimal condition for inflation;

said device being adapted to operate the previously described method.

BRIEF DESCRIPTION OF THE DRAWINGS

All the embodiment details are given in the following description, supplemented by FIGS. 1 and 2, in which.

DETAILED DESCRIPTION OF THE INVENTION

In the present description, the following terms are used notably for the following meanings:

"Non-critical under-inflation condition" means a loss of pressure that is substantially greater than or equal to 200 mbar relative to the recommended nominal pressure when cold. Beyond a certain threshold, advantageously set at 400 mbar, the level of under-inflation is considered severe. At this level, a distinct alarm for severe under-inflation is advantageously provided. It is also possible to extend this definition to all cases in which the tire inflation pressures are not fully satisfactory, for example when one of the tires is markedly less (or even more) inflated than the average of the other three, while not having a measured inflation pressure lower than the recommended inflation pressure.

"Heating state" means a rise in temperature due to a mechanical force sustained by the tire, such as for example running, which generates a series of deformations close to the portion in contact with the ground which sustains a partial flattening.

"Tire pressure management and measurement system" or "tire pressure monitoring system", often called "TPMS" for "Tire Pressure Management System", means a system making it possible at least to collect the tire pressure values of a vehicle and to supply an "output" for example in the form of an item of information associated with these values. This output may be an alarm due to an under-inflation situation, an item of information on the pressure values present in the tires, an alarm informing that a leak has been detected, etc. A TPMS system may operate independently or be associated with other items of equipment of a vehicle, such as for example a screen making it possible to display the various states and alarms.

"Pressure-related data" means data such as the absolute tire pressure values and the values that are directly or indirectly associated with pressure such as the presence of a leak, the rate of pressure loss, etc.

Figure 2:
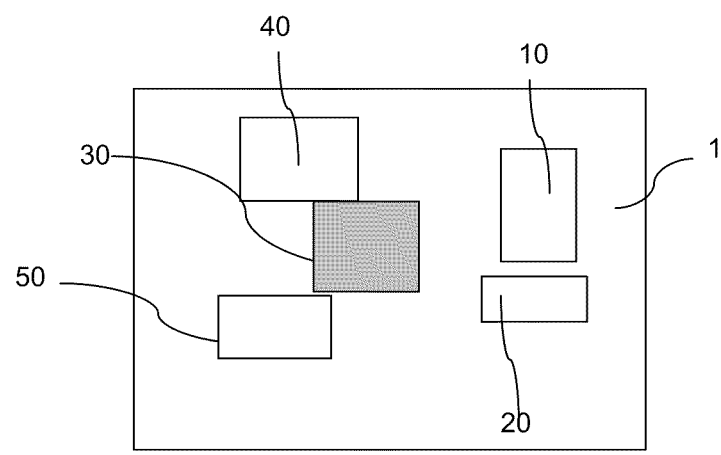
FIG. 2 shows a schematic representation of an example of an inflation assistance device according to the invention.

FIG. 2 shows a schematic representation of an inflation assistance device 1 for a vehicle according to the invention. It comprises an input or access to data 10 relating to the pressure from at least one tire of a vehicle and an input or access to data 20 relating to the temperature of the said tires. The data inputs are advantageously obtained by a data transmission means such as a communication bus of the vehicle.

An under-inflation detection module 50 makes it possible to take several measurements of the pressure value spaced over time. This feature makes it possible to monitor the change in the pressure value as a function of time. By comparing this change with preset leakage threshold values, the presence of leaks may be revealed. The detection module 50 may comprise a microprocessor or another computing means, and test commands or instructions.

Figure 1:
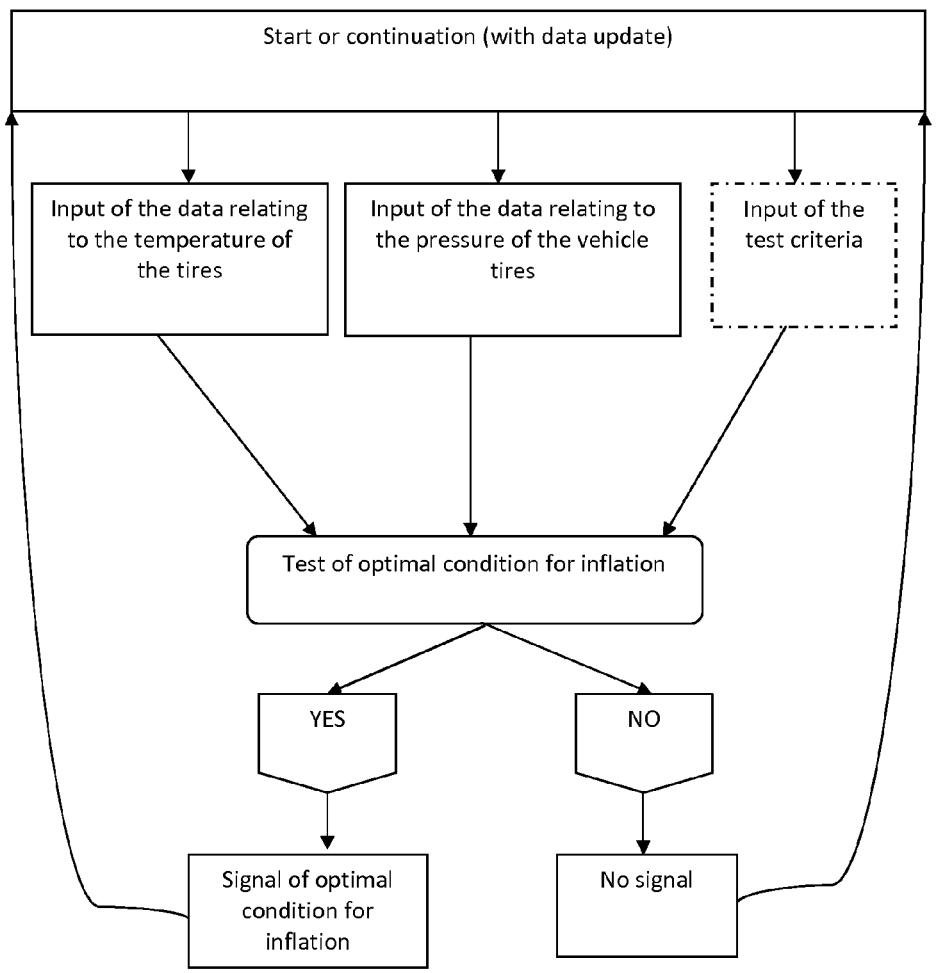
FIG. 1 shows a functional flowchart illustrating schematically the various steps of the method according to the invention.

An inflation condition test module 30, having access on the one hand to the pressure-related data 10 and on the other hand to the temperature-related data 20 of at least one tire of the vehicle, makes it possible to detect a possible optimum condition for inflation. The test module 30 may comprise a microprocessor or other computing means, and test commands or instructions. The test parameters 40, stored in the device, or supplied before a test is run, make it possible to configure the test module so that the latter can identify the cases in which an optimum condition for inflation is or is not present. FIG. 1, described later, makes it possible to illustrate the operating principle of the test module.

If there is an optimum condition for inflation, an optimal condition for inflation output allows the transmission of a corresponding signal. Furthermore, if an optimal condition for inflation is detected, the test module continues the analysis of the signal, either to ascertain that the condition is maintained or, on the contrary, that the condition ceases, because one or more criteria are no longer satisfied. The method therefore operates in a loop.

The optimal condition for inflation signal may be used to send a message to the user, by the intervention of a visual or audible means. The means for processing the output signal, the display means, and other elements allowing such functions may be provided outside the inflation assistance device 1. A wire or microwave link then allows the data transfers.

The device and the method according to the invention are advantageously provided either for integration into a tire pressure management system (TPMS), or in order to interact, notably by data interchange, with such a system. Therefore, the pressure-related and temperature-related data originate advantageously from a pressure measurement and management system. This type of system is usually provided with pressure and temperature sensors installed in the wheels or in the tires of the vehicle. The data are transmitted by radio waves, either continuously, or at regular intervals, or else when a sudden change in the pressure and/or temperature is detected. A receiver and a central processing unit allow the reception and processing of the data. The result of this processing may be used to transmit information to the driver, either in audible form, and/or in visual form. Accordingly, many tire pressure management systems are connected to a display which may be dedicated to this function or a display being used to present various types of parameters of the vehicle and/or of its environment. The latter case is normal when the tire pressure management system is supplied as original equipment.

Such tire pressure management systems may also be supplied as an accessory. They may in this case be fitted to any type of vehicle. A unit for receiving and processing the radio waves is then installed inside the passenger compartment.

FIG. 1 illustrates the key steps of applying the method and the device according to the invention. First of all, various data, originating from the various sources, are received: the data 20 relating to the temperature of the tires, the data 10 relating to the pressure of the tires of the vehicle and the data 40 relating to the test criteria if the latter are not already present in the device.

According to an advantageous embodiment, the latter data may be provided in a permanent manner, and the user does not have to concern himself with them. According to a variant embodiment, these data may be supplied by the user, for example with the aid of a menu provided on the user interface.

Once the data are available, the device may carry out the test or tests necessary to detect a possible optimal condition for inflation. As mentioned above, the device operates advantageously in a loop, in a substantially continuous manner. In particular, when an optimal condition for inflation is revealed, it is important to be able to check if this condition lasts or not. Thanks to this substantially continuous monitoring, as soon as the optimal condition ceases, the corresponding signal ceases and the user is informed of this change in the situation.

For the application of the method and of the device according to the invention, various parameters must be considered. First of all, with respect to the pressure-related parameters, in addition to the absolute pressure values for each of the tires, the knowledge of the presence of a leak, of the pressure levels recommended according to load and/or speed, and the pressure difference between two tires positioned on one and the same axle, may be useful for determining certain situations.

The multiple data items relating to the pressure and the temperature of the tires may be obtained by a tire pressure measurement and management system.

With or without a tire pressure measurement and management system, the useful magnitudes are data associated with or data dependent on the pressure, in this instance called "pressure-related data" or "pressure data". These are in particular the following data:
- the real or actual pressure value of at least one of the tires of the vehicle;
- the recommended pressure threshold or thresholds: these are usually pressure values indicated by the manufacturer of the vehicle;
- the presence or absence of a leak: a tire pressure measurement and management system or an under-inflation detection module is capable of taking several measurements of the pressure value spaced over time. This feature makes it possible to monitor the change in the pressure value over time. By comparing this change with preset leakage threshold values, the presence of leaks may be revealed. For example, a leak of the order of approximately 100 mbar/month may be revealed with great reliability. This type of leak is often qualified as a "slow" leak since it allows the vehicle to be used within certain limits. So long as the total quantity of escaped air does not exceed a certain threshold, the pressure of the tire may be within a convenient range of use. After a certain time, the pressure value is situated below the recommended pressure value and the module may transmit a warning signal. At this stage, even if it is a "slow" leak, a corrective action must be taken very quickly. Larger leaks may evidently also be detected. A leak of the order of 100 mbar/h or more is often qualified as a "fast" leak.

The invention claimed is:

1. A method for assisting with non-critical inflation of tires for a vehicle fitted with a set of tire pressure sensors, a set of tire temperature sensors, and a microprocessor, the method comprising:

supplying the microprocessor with pressure data relating to a pressure of at least one of the tires of the vehicle, the pressure data being measured by at least one of the tire pressure sensors;

supplying the microprocessor with temperature data relating to a temperature of at least one of the tires of the vehicle, the temperature data being measured by at least one of the tire temperature sensors;

with aid of the microprocessor supplied with the pressure data and the temperature data, notifying a user of a possible non-critical under-inflation condition present in at least one of the tires of the vehicle; and testing, by the microprocessor, to determine whether a condition is acceptable for inflation, if a verification of a non-critical under-inflation condition is received, and determining that the condition is acceptable for inflation upon simultaneous occurrence of:
a non-critical under-inflation condition for at least one of the tires of the vehicle, based on measurements by at least one of the tire pressure sensors,
the tires of the vehicle not being in a hot state due to running of the vehicle, based on measurements by the tire temperature sensors, and
the tires of the vehicle not being in a hot state due to heating by sun exposure, based on measurements by the tire temperature sensors; and, when an acceptable condition for inflation is determined, transmitting a corresponding signal.

2. The method according to claim 1, wherein the non-critical under-inflation condition corresponds to a measured inflation pressure that, when a tire is cold, is less than a recommended nominal pressure by a value in a range of approximately 200 mbar to 400 mbar.

3. The method according to claim 1, wherein test parameters used in the testing are defined so that the tires of the vehicle are not considered to be in a hot state if a difference between an ambient temperature and a temperature value of each of the tires of the vehicle does not exceed 5° C.

4. The method according claim 1, wherein test parameters used in the testing are defined so that the tires of the vehicle are not considered to be in a hot state if there is less than 5° C. of difference between an average of temperatures of front tires located at a front part of the vehicle and an average of temperatures of rear tires located at a rear of part of the vehicle.

5. The method according to claim 1, wherein test parameters used in the testing are defined so that the tires of the vehicle are not considered to be in a hot state if a difference between a temperature of a spare wheel tire and an average temperature of the tires of the vehicle does not exceed 5° C.

6. The method according to claim 1, wherein test parameters used in the testing are defined so that the tires of the vehicle are not considered to be in a hot state due to heating by sun exposure when a maximum temperature difference between a hottest tire and a coldest tire does not exceed 5° C.

7. The method according to claim 1, wherein test parameters used in the testing are defined so that the tires of the vehicle are not considered to be in a hot state due to heating by sun exposure when a maximum temperature difference between a hottest tire and a coldest tire does not exceed 3° C.

8. The method according to claim 1, wherein, in the testing, the microprocessor receives a verification that the tires of the vehicle are at a temperature within a range of 0° C. to 5° C. of that measured at a moment when under-inflation is detected.

9. The method according to claim 1, wherein, when any of:
- a condition in which a non-critical under-inflation condition has been detected for at least one of the tires of the vehicle,
- a condition in which the tires of the vehicle are not in a hot state due to running of the vehicle, and
- a condition in which the tires of the vehicle are not in a hot state due to heating by sun exposure is no longer satisfied, then the signal is no longer transmitted.

10. A device for assisting with non-critical inflation of tires of a vehicle, the device comprising:
- an input that receives pressure data of at least one of the tires of the vehicle, the pressure data being measured by at least one tire pressure sensor;
- an input that receives temperature data of at least one of the tires of the vehicle, the temperature data being measured by at least one tire temperature sensor;
- an under-inflation detection module that utilizes the pressure data and the temperature data to detect a possible non-critical under-inflation condition present on one or more of the tires of the vehicle; and
- a testing module that carries out tests to determine whether a condition is acceptable for inflation, the tests being carried with aid of a microcprocessor if a verification of a non-critical under-inflation condition is received, wherein
  - the microprocessor is supplied with the pressure data,
  - the microprocessor is supplied with the temperature data,
  - the microprocessor determines that a condition is acceptable for inflation if the verification of a non-critical under-inflation condition is received and provided that there is simultaneous occurrence of:
    - a non-critical under-inflation condition for at least one of the tires of the vehicle,
    - the tires of the vehicle not being in a hot state due to running of the vehicle, based on measurements by the at least one tire temperature sensor, and
    - the tires of the vehicle not being in a hot state due to heating by sun exposure, based on measurements by the at least one tire temperature sensor, and,
  - when an acceptable condition for inflation is determined, the testing module transmits a corresponding signal.

11. The device according to claim 10, wherein the non-critical under-inflation condition corresponds to a measured inflation pressure that, when a tire is cold, is less than a recommended nominal pressure by a value in a range of approximately 200 mbar to 400 mbar.

12. The device according to claim 10, wherein test parameters used in the testing module are defined so that the tires of the vehicle are not considered to be in a hot state if a difference between an ambient temperature and a temperature value of each of the tires of the vehicle does not exceed 5° C.

13. The device according claim 10, wherein test parameters used in the testing module are defined so that the tires of the vehicle are not considered to be in a hot state if there is less than 5° C. of difference between an average of temperatures of front tires located at a front part of the vehicle and an average of temperatures of rear tires located at a rear of part of the vehicle.

14. The device according to claim 10, wherein test parameters used in the testing module are defined so that the tires of the vehicle are not considered to be in a hot state if a difference between a temperature of a spare wheel tire and an average temperature of the tires of the vehicle does not exceed 5° C.

15. The device according to claim 10, wherein test parameters used in the testing module are defined so that the tires of the vehicle are not considered to be in a hot state due to heating by sun exposure when a maximum temperature difference between a hottest tire and a coldest tire does not exceed 5° C.

16. The device according to claim 10, wherein test parameters used in the testing module are defined so that the tires of the vehicle are not considered to be in a hot state due to heating by sun exposure when a maximum temperature difference between a hottest tire and a coldest tire does not exceed 3° C.

17. The device according to claim 10, wherein, to determine whether a condition is acceptable for inflation, the testing module receives a verification that the tires of the vehicle are at a temperature within a range of 0° C. to 5° C. of that measured at a moment when under-inflation is detected.

18. The device according to claim 10, wherein, when any of:
- a condition in which a non-critical under-inflation condition has been detected for at least one of the tires of the vehicle,
- a condition in which the tires of the vehicle are not in a hot state due to running of the vehicle, and
- a condition in which the tires of the vehicle are not in a hot state due to heating by sun exposure is no longer satisfied, then the signal is no longer transmitted.

* * * * *